(12) United States Patent
Davidson

(10) Patent No.: US 6,559,791 B1
(45) Date of Patent: May 6, 2003

(54) DUAL PORT MEMORY ARBITRARY WAVEFORM GENERATOR

(75) Inventor: Walter F. Davidson, Hudson, NH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/161,995

(22) Filed: May 31, 2002

(51) Int. Cl.[7] .................................................. G01S 7/40
(52) U.S. Cl. ........................ 342/169; 342/82; 342/165; 342/170; 342/175; 342/195
(58) Field of Search ................................. 342/165–175, 342/195, 82–89; 702/57–80, 85–126; 708/200, 230–277, 845–854; 324/500, 501, 511, 512, 527, 528, 532–535, 537; 434/1, 2, 3, 4, 5

(56) References Cited

U.S. PATENT DOCUMENTS

| 3,914,623 | A | * | 10/1975 | Clancy | 342/174 |
|---|---|---|---|---|---|
| 4,005,424 | A | * | 1/1977 | Fetter | 342/171 |
| 4,968,968 | A | * | 11/1990 | Taylor | 342/174 |
| 5,053,772 | A | * | 10/1991 | Lamper et al. | 342/175 |
| 5,133,663 | A | * | 7/1992 | Willingham et al. | 434/2 |
| 5,160,264 | A | * | 11/1992 | Banura et al. | 434/2 |
| 5,431,568 | A | * | 7/1995 | Fey et al. | 434/2 |
| 5,457,463 | A | * | 10/1995 | Vencel et al. | 342/169 |
| 5,760,736 | A | * | 6/1998 | Przybysz et al. | 342/175 |
| 5,854,604 | A | * | 12/1998 | Przybysz et al. | 342/175 |
| 5,892,479 | A | * | 4/1999 | Mills et al. | 342/172 |
| 6,075,480 | A | * | 6/2000 | Deliberis, Jr. | 342/169 |
| 6,384,771 | B1 | * | 5/2002 | Montague et al. | 342/170 |
| 6,498,583 | B1 | * | 12/2002 | Tsai et al. | 342/169 |

\* cited by examiner

Primary Examiner—Bernarr E. Gregory
(74) Attorney, Agent, or Firm—William G. Auton

(57) ABSTRACT

A dual port memory waveform generator system uses a clock-based system whose pulse durations and separations were set by counters that use the same fundamental clock frequency of the radar to be simulated. This pulse generator is loaded from a laptop computer. The output pulses are used to control pin switches to switch various frequencies, amplitudes, or phases as required for the particular radar being simulated. The result is a system with very good fidelity that will fit in a suitcase, and is very portable.

5 Claims, 3 Drawing Sheets

DUAL PORT MEMORY ARBITRARY WAVEFORM GENERATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar system waveform generators and more specifically to a design for a waveform generator that multiplexes highly complex combinations of signals using a dual port memory.

In the electronic warfare community there has been a long-standing problem of duplicating radar waveforms. This need has become even more complex with the changes made to modem radar systems. It is not unusual in modem systems to find tracking waveforms, search waveforms, and command data streams all time multiplexed into a frame format. These systems can use amplitude, frequency, or phase shifts on individual pulses. While some systems used in modem anechoic chambers have the ability to replicate these waveforms, many do not. It is also becoming more important for the systems which replicate threat waveforms to be more readily available and portable to suitably check out equipment for test and evaluation. In order to really produce these waveforms accurately, it is necessary for the time resolution of the simulator to match that of the original system. It has been shown that a resolution shift of less than $1/10$ of one percent can cause some systems to operate improperly.

Samples of waveform generators with dual port memory elements are disclosed in the following U.S. Patents, the disclosures of which are incorporated herein by reference:

U.S. Pat. No. 5,247,303, Sep. 21, 1993, Data quality and ambiguity resolution in a Doppler radar system, Cornelius, Richard H., U.S. Pat. No. 5,805,793, Sep. 8, 1998, Stand-alone test device for testing command-response remote terminals, Green Samuel I., U.S. Pat. No. 5,795,297, Aug. 18, 1998, Ultrasonic diagnostic imaging system with personal computer architecture, Daigle, Ronald E., U.S. Pat. No. 5,389,859, Feb. 14, 1995, Display device including a correction circuit for correcting a position error, and correction circuit for use in such a display device, Stessen, Jeroen H.

U.S. Pat. No. 5,042,000, Aug. 20, 1991, Integral transform method, Baldwin, David R., U.S. Pat. No. 5,056,015, Oct. 8, 1991, Architectures for serial or parallel loading of writable control store, Baldwin, David R.

The general purpose of this design was to provide the ability to replicate the waveform of radar systems. Modern day radar signals are getting very complex with signals that multiplex command data to missiles; as well the traditional problem of seeing reflected energy from targets. Due to this highly complex nature, it is important to replicate the signal with very high fidelity. Many modern avionics systems are trying to derive information from this radar signal. To be able to test these systems, it is necessary to be able to generate appropriate signals and observe the response from the equipment under test.

SUMMARY OF THE INVENTION

The present invention includes a portable waveform generator system that uses a dual port memory to multiplex complex waveforms for a radar transmitter. In one embodiment a laptop is used to specify the frequency, pulse width, chip configuration, etc. for the waveform generator. The waveform generator outputs up to two-frequency waveform signals that are multiplexed by a combiner in the memory and output to the radar transmitter.

The actual waveform generator includes a clock-based system whose pulse durations and separations were set by counters that use the same fundamental clock frequency of the radar to be simulated. This pulse generator is loaded from a laptop computer. The output pulses are used to control pin switches to switch various frequencies, amplitudes, or phases as required for the particular radar being simulated. The result is a system with very good fidelity that will fit in a suitcase, and is very portable.

DETAILED DESCRIPTION OF THE PREFERRED EMBODIMENT

Figure 1:
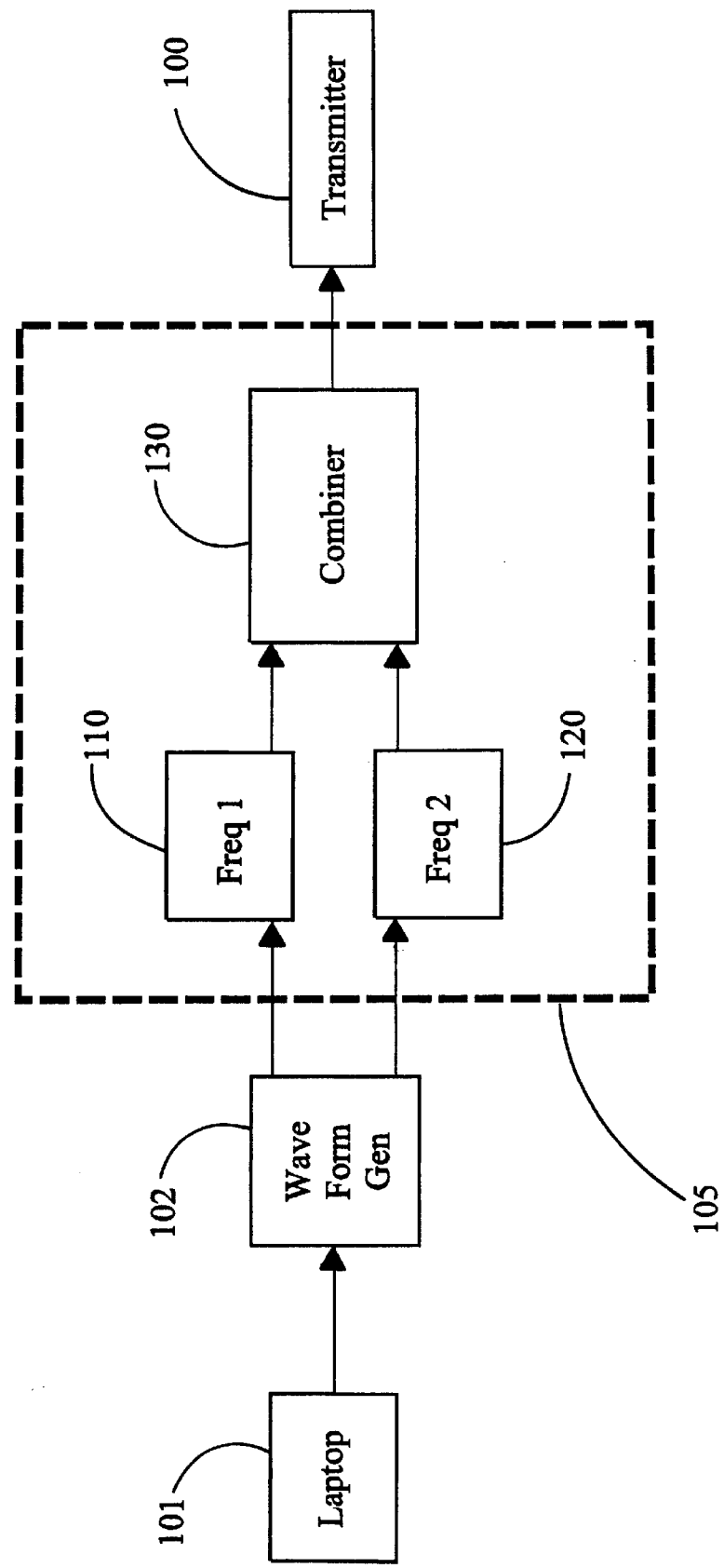
FIG. 1 is a block diagram of the present invention as used by a radar transmitter.

The present invention is designed for a waveform generator that multiplexes combinations of highly complex signals using a dual port memory, as shown in FIG. 1. The system of FIG. 1 is a clock-based system whose pulse durations and separations are set by counters that use the same fundamental clock frequency of the radar to be simulated. This pulse generator is loaded from a laptop computer. The output pulses are used to control pin switches to switch various frequencies, amplitudes, or phases as required for the particular radar being simulated. The result is a system with very good fidelity that will fit in a suitcase, and is very portable.

The system of FIG. 1 provides signals for a radar transmitter 100 using a laptop computer 101, waveform generator 102 and a dual port memory 105 that has two signal inputs 110 and 120 and a combiner 130.

The uniqueness of this approach is as follows:

1. A low cost system.

2. A portable system.

3. A counter based system that uses the same fundamental clock frequency of the radar to be simulated.

4. A system that can be synchronized to an external signal.

5. A system that allows count frequencies up to 20 MHz by using memory cycles times that are twice as long as the count frequency.

6. A system that allows a pair of pulse descriptor words to be repeated up to 255 times.

7. A system that provides bank switching between templates by setting a new start address. This allows changes between templates without gaps in time.

8. A system that provides 2048 pulse descriptor words.

9. A system that has 8 auxiliary outputs that can be used to synchronize or control other auxiliary equipment on a pulse-to-pulse basis. This could be used to shift amplitude, frequency, or phase with an appropriate transmitter.

10. A system that allows data words to be updated asynchronously without interruption of the output waveform.

11. A system that provides multiple pulse outputs whose positions and durations to be precisely controlled at the fundamental clock frequency. These pulses can overlap with different start times and durations as required.

12. A system that has many other applications that can be used whenever the control of multiple pulse positions and durations is required.

Figure 2:
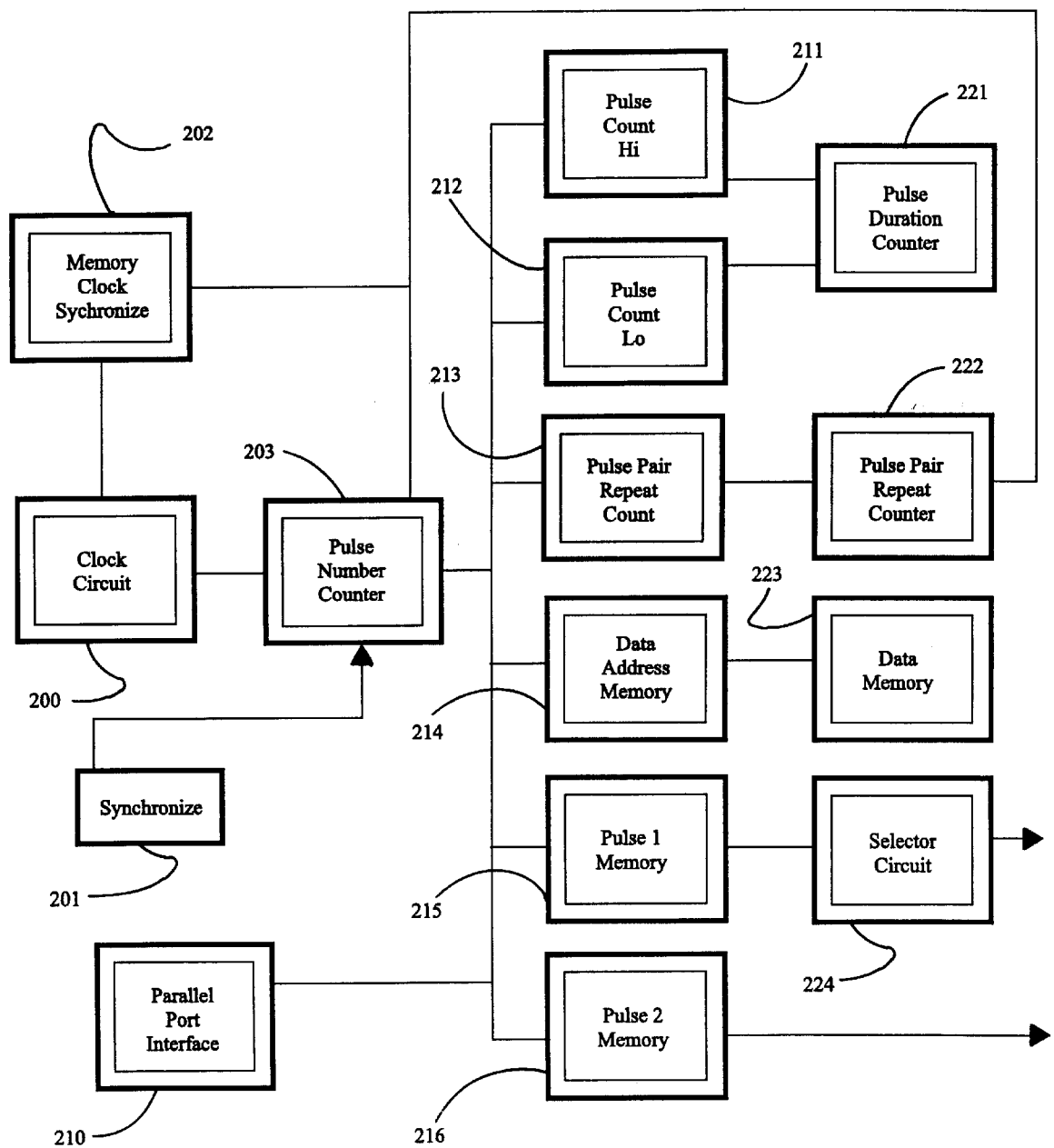
FIG. 2 is a block diagram of the waveform generator of FIG. 1.

A functional description of the dual port memory arbitrary waveform generator's major functional blocks follows. A functional block diagram of the generator is shown in FIG. 2.

The clock circuit 200 uses a 74ALS04 inverter as a crystal oscillator. The capacitor in series with the crystal allows the frequency to be adjusted slightly. Many applications require the frequency of the oscillator to be within less than 1/10 of one percent of the desired frequency. The output of the last inverter is fed into a 74ALS 163 counter. The counter divides the crystal frequency by two and produces a square wave with a 50% duty factor. With the specified parts the circuit has been demonstrated with crystals up to 40 MHz. With the divide by two, the basic circuit can operate to simulate a waveform with a basic clock frequency up to 20 MHz.

The Memory Clock Synchronizer 202 is used to divide the Pulse duration clock by two to allow sufficient time to access the data out of the dual port memories. The circuit uses a 74ALS163 counter and 74ALS74 flip-flops to insure that the phase of the memory access is always the same when the pulse duration counter reaches maximum count, whether the pulse duration is odd or even. This is necessary in order to satisfy the propagation delays to have the data out of the dual port memories valid by the time they are used. This unique approach allows the pulse duration counter to run at double the frequency as the memory cycles. The penalty for this approach is that the minimum duration of a pulse address is two clock cycles, but allows a resolution of one cycle. The parallel port interface 210 is the interface of the laptop of FIG. 1 with the waveform generator.

The pulse counter 203 consists of three 74ALS 169 up/down counters that provide the address to enable access to the 2048 pulse descriptor words that reside in the dual port memories. The down feature of the counters is used to allow the repeat of a pair of pulse description words to produce a burst of pulses. Up to 255 repeats of a pulse pair can be programmed using only two pulse descriptor addresses. The repeat sequence is constrained to be an even address followed by an odd address, repeated the number of times in the repeat memory of the odd address word. A 74 ALS374 stores the count that the 74ALS169 counters load when a restart pulse occurs. This restart pulse comes either from the pulse memory at the last waveform descriptor word or from a 74ALS74 flip-flop that allows the waveform to be synchronized to an external input.

The Pulse Duration counter 221 uses four 74ALS 163 counters to allow pulses with durations of 2 to 65536 clock counts to be created. At the completion of the count, the counters are loaded with the next pulse duration from two 7132 dual port memories. The restriction of the minimum of 2 clock cycle duration is caused from the fact that the memories are running with a cycle time ½ of the clock running the Pulse Duration and Pulse Number Counters. The load command for the next duration value is delayed one clock cycle in order to give sufficient access time for the dual port memories. The output from the Pulse Duration Counter is used as an input to the Pulse Pair Repeat Counter and the Pulse Number Counter. The value to be loaded into the Pulse duration counter to produce the proper counter duration is "65536−(x−1)". Where x is the desired number of clock cycles.

The Pair Counter uses two 74ALS 163 counters to allow the repeat of an even and odd pulse number pair up to 255 times. This circuit uses some simple combinational logic to set the up/down direction control pin of the Pulse Number Counter. This circuit insures that the Pulse Number Counter will always be commanded to count up if the Pulse Number is even. If the pulse number is odd, the Pulse Number Counter will be commanded to count down, which will cause the even/odd pair to be repeated until the pair counter has expired. Once the maximum count has been reached, the command to count up will be issued and the next pair count is loaded. The value that should be loaded into the counter is "256−cnt", where cnt is the number of times that the pulse pair should be created.

The Selector circuit 324 is used to combine the values of the Pulse Memory and the Data Memory to determine which lines to activate. There are three lines used for a special data output. These lines are designed to be active low, and only one will be active at a time. These lines are designed to be used to produce some form of modulation for data transmission. These lines can be used to produce AM, FM or PM depending on the type of modulator that these lines are hooked to. The lower four bits control the 3 output lines labeled: HI FREQ(0), CARRIER, LO FREQ(1). The following table shows the selection caused by the low 4 bits into the selector.

| Selector | |
|---|---|
| 0000 | Data Bit 0 |
| 0001 | Data Bit 1 |
| 0010 | Data Bit 2 |
| 0011 | Data Bit 3 |
| 0100 | Data Bit 4 |
| 0101 | Data Bit 5 |
| 0110 | Data Bit 6 |
| 0111 | Data Bit 7 |
| 1000 | Odd Parity |
| 1001 | Even Parity |
| 1010 | Not Used |
| 1011 | Not Used |
| 1100 | HI FREQ (0) |
| 1101 | LO FREQ (1) |
| 1110 | CARRIER |
| 1111 | None |

The upper four bits of the pulse descriptor word are independent to the lower four bits and have the following definition:

Bit 4 sync output

Bit 5 sync 2 output, also used to reset dwell input strobe

Bit 6 ok to dwell start, and ok to load data memory

Bit 7/reset

Parallel Port Interface. The interface to all of the dual port memories is through a parallel printer port of an IBM compatible laptop. The printer port occupies three I/O address in the computer, that are referred to as base, base+1, and base+2. Where base is machine dependent but usually is one of the following addresses, 0278H, 0378H, or 03BCH. The following table shows the computer bit definitions:

| | | |
|---|---|---|
| Base + 00 | pin 2 | Data bit 0 |
| Base + 01 | pin 3 | Data bit 1 |
| Base + 02 | pin 4 | Data bit 2 |
| Base + 03 | pin 5 | Data bit 3 |
| Base + 04 | pin 6 | Data bit 4 |
| Base + 05 | pin 7 | Data bit 5 |
| Base + 06 | pin 8 | Data bit 6 |
| Base + 07 | pin 9 | Data bit 7 |
| Base + 10 | | |
| Base + 11 | | |
| Base + 12 | | |
| Base + 13 | pin 15 | Not Used |
| Base + 14 | pin 13 | Read Pulse 2 bit 4 status |
| Base + 15 | pin 12 | Read Pulse 2 bit 5 status |
| Base + 16 | pin 10 | Read Pulse 2 bit 6 status |
| Base + 17 | pin 9 | Read Pulse 2 bit 7 status |
| Base + 20 | pin 1 | Write Data |
| Base + 21 | pin 14 | Write address lo for dual port memories |
| Base + 22 | pin 16 | Write address hi for dual port memories |
| Base + 23 | pin 17 | Select Function |
| Base + 24 | | |
| Base + 25 | | |
| Base + 26 | | |
| Base + 27 | | |

The selection only uses the low 4 bits of the data bus. The following table shows what writing data with various values into the selection register will do:

| | |
|---|---|
| 0000 | Write data to Data memory |
| 0001 | Write data to Data Address memory |
| 0010 | Write data to Pulse memory |
| 0011 | Write data to Duration Lo memory |
| 0100 | Write data to Duration Hi memory |
| 0101 | Write data to Count bank |
| 0110 | Write data to Data bank |
| 0111 | Reset Pulse Number Counter |
| 1000 | Write data to Pulse 2 memory |
| 1001 | Write data to Repeat memory |

The Pulse Count Hi and Lo memories 211 and 212 contain the value to be loaded into the pulse duration counter. The value to be loaded is "65536−(cnt−1)". Where cnt is the number of clock cycles of the desired duration.

The Pulse Pair Repeat Count memory contains the value to be loaded into the Pulse Pair Repeat counter. The to be loaded is "256−cnt". Where cnt is the number of times a pair of locations is to be executed.

The Data Address memory 214 contains the address for the Data memory for a pulse descriptor location the value to be loaded is the 8 low bits of the desired address.

The Data memory 223 contains the data word to be sent using the selector. The value loaded is the desired data word.

The Pulse memory 215 contains the descriptor word for this pulse position. The value loaded is the desired descriptor word.

The Pulse 2 memory 216 contains the values of 8 independent output lines as an additional pulse descriptor word.

Figure 3:
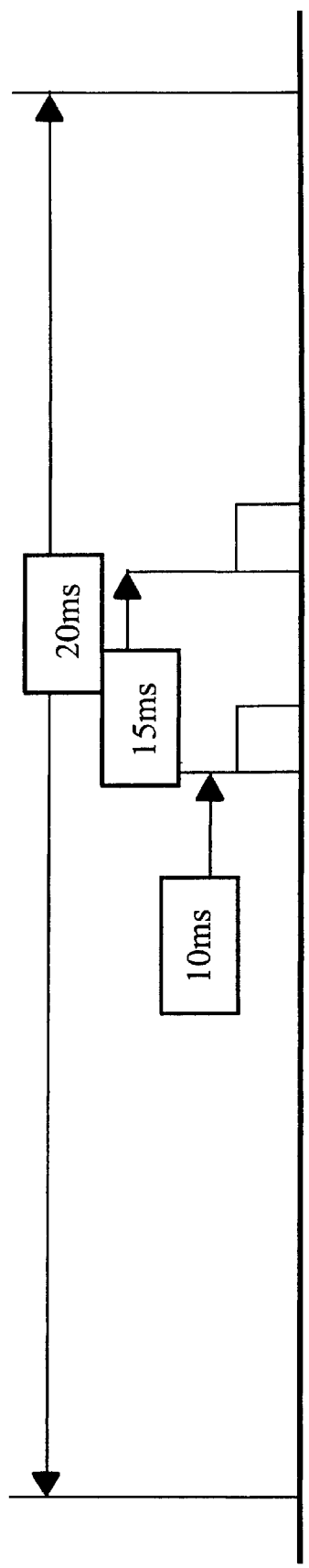
FIG. 3 is a chart of a waveform pulse.

As an example, consider what the program would be for the example waveform of FIG. 3. In FIG. 3, the frame time for this waveform is 20 ms, the first burst is used for tracking and is 100 pulses with a 1us pulse width with a 10 us PRI. This burst starts 1 ms after the start of the frame. The second and third bursts are FSK commands, which are frequency lo for a zero or frequency hi for a one. Each pulse is 1 ms long. Let us use a 2 Mhz clock as the counter The following table shows a way to program this waveform.

| Address | us Duration | Clocks | 65536-(clocks-1) | Count Hi | Count Lo |
|---|---|---|---|---|---|
| 0 | 2 | 4 | 65533 | 255 | 253 |
| 1 | 989 | 1978 | 63559 | 248 | 71 |
| 2 | 9 | 18 | 65519 | 255 | 239 |
| 3 | 1 | 2 | 65535 | 255 | 255 |
| 4 | 8009 | 16018 | 49519 | 193 | 111 |
| 5 | 1000 | 2000 | 63537 | 248 | 49 |
| 6 | 4000 | 8000 | 57537 | 224 | 193 |
| 7 | 1000 | 2000 | 63537 | 248 | 49 |
| 8 | 3999.5 | 7999 | 57538 | 224 | 194 |
| 9 | 2 | 4 * | 65533 | 255 | 253 |

* Only one clock count will elapse but a larger number needs to be programmed for the reset case The following table shows the construction of the Pulse word:

| Address | /reset | ok to sync | /reset dwell start | sync | sel | total |
|---|---|---|---|---|---|---|
| 0 | 1 | 1 | 0 | 1 | 15 | 223 |
| 1 | 1 | 1 | 1 | 0 | 15 | 239 |
| 2 | 1 | 1 | 1 | 0 | 15 | 239 |
| 3 | 1 | 1 | 1 | 0 | 14 | 238 |
| 4 | 1 | 1 | 1 | 0 | 15 | 239 |
| 5 | 1 | 1 | 1 | 0 | 00 | 224 |
| 6 | 1 | 1 | 1 | 0 | 15 | 239 |
| 7 | 1 | 1 | 1 | 0 | 01 | 225 |
| 8 | 1 | 1 | 1 | 0 | 15 | 239 |
| 9 | 0 | 1 | 1 | 0 | 15 | 111 |

Using memory location 1 for the data and putting an initial value of 2 into that location results in the following data to be loaded into the 7 dual port memories.

| Address | Count Hi | Count Lo | Pulse | data address | data | Pulse 2 | repeat |
|---|---|---|---|---|---|---|---|
| 0 | 255 | 253 | 223 | 0 | 0 | 0 | 255 |
| 1 | 248 | 071 | 239 | 0 | 2 | 0 | 255 |
| 2 | 255 | 239 | 239 | 0 | 0 | 0 | 156 |
| 3 | 255 | 255 | 238 | 0 | 0 | 0 | 156 |
| 4 | 193 | 111 | 239 | 0 | 0 | 0 | 255 |
| 5 | 248 | 049 | 224 | 1 | 0 | 0 | 255 |
| 6 | 224 | 193 | 239 | 0 | 0 | 0 | 255 |
| 7 | 248 | 049 | 225 | 1 | 0 | 0 | 255 |
| 8 | 224 | 194 | 239 | 0 | 0 | 0 | 255 |
| 9 | 255 | 253 | 111 | 0 | 0 | 0 | 255 |

| Item | Count | Mfg ID | Attributes | RefDes |
|---|---|---|---|---|
| 1 | 3 | 74ALS169B | DIP16 | U21, U22, U23 |
| 2 | 1 | 74LS00 | DIP14 | U32 |
| 3 | 2 | 74LS08 | DIP14 | U29, U34 |
| 4 | 1 | 74LS20 | DIP14 | U28 |
| 5 | 2 | 74LS74A | DIP14 | U30, U36 |
| 6 | 3 | 74LS138 | DIP16 | U8, U24, U46 |
| 7 | 2 | 74LS151 | DIP16 | U6, U7 |
| 8 | 1 | 74LS245 | DIP20 | U2 |
| 9 | 1 | 74LS280 | DIP14 | U1 |
| 10 | 11 | 74LS374 | DIP20 | U3, U4, U5, U14, U20, U25, U26, U33, U39, U40, U42 |
| 11 | 7 | 7132A | DIP48X | U15, U16, U17, U18, U19, U38, U41 |

-continued

| Item | Count | Mfg ID | Attributes | RefDes |
|------|-------|--------|------------|--------|
| 12 | 4 | 7404 | DIP14 | U27, U31, U37, U45 |
| 13 | 8 | 74163 | DIP16 | U9, U10, U11, U12, U13, U35, U43, U44 |
| 14 | 2 | C | CK05 10p | C2, C3 |
| 15 | 1 | C | CK05 .01UF | C1 |
| 16 | 1 | DB25M | DSHELL25-M | P1 |
| 17 | 2 | HDR20 | HDR20 | P2, P3 |
| 18 | 4 | R | RC05 4.7k | R3, R4, R5, R6 |
| 19 | 2 | R | RC05 560 | R1, R2 |

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A dual port memory waveform generator system comprising:
    a data processor means which enables a user to input waveform parameters that comprise waveform frequency, pulse length, amplitude, phase shift characteristics and chip characteristics;
    a means for generating first and second waveform output signals; and
    a dual port memory combiner means which has a first port that receives and processes the first waveform output signal, and a second port which receives and processes the second waveform output signal, and an internal memory multiplexor which multiplexes the first and second waveform output signals into radar waveforms for a radar transmitter.

2. A dual port waveform generator as defined in claim 1, wherein said data processor means comprises a portable laptop computer.

3. A dual port waveform generator as defined in claim 1, wherein said generating means comprises:
    a 25 pin parallel port which receives said waveform parameters from said portable laptop computer;
    a means for generating a clock pulse signal; and
    a first and second means for generating pulse output signals timed by said clock pulse signal and in accordance with said waveform parameters.

4. A dual port memory waveform generator as defined in claim 3, wherein said first and second generating means comprises first and second pulse generators.

5. A dual port memory waveform generator as defined in claim 4, wherein said means for generating the clock pulse signal comprises:
    a clock circuit that can be adjustably operated to output a basic clock frequency signal up to 20 MHz;
    a memory clock synchronizer that divides the basic clock frequency signal by two to produce output signals thereby;
    a system synchronization unit that outputs a master clock signal; and
    a pulse number signal that outputs first and second control signals to the first and second pulse generators by processing the master clock signal with the output signals of the memory clock synthesizer.

* * * * *